(12) United States Patent
Matsumoto et al.

(10) Patent No.: US 6,467,870 B2
(45) Date of Patent: Oct. 22, 2002

(54) RECORDING HEAD

(75) Inventors: Nobuo Matsumoto, Kanagawa (JP); Jin Murayama, Miyagi (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/909,810

(22) Filed: Jul. 23, 2001

(65) Prior Publication Data

US 2002/0008731 A1 Jan. 24, 2002

(30) Foreign Application Priority Data

Jul. 21, 2000 (JP) ........................................ 2000-220857

(51) Int. Cl.[7] ............................................... B41J 2/145
(52) U.S. Cl. ............................. 347/19; 347/40; 347/43
(58) Field of Search ............................. 347/19, 40, 43, 347/49, 42; 358/472

(56) References Cited

U.S. PATENT DOCUMENTS 6,084,607 A * 7/2000 Matsuda ...................... 347/19
6,254,218 B1 * 7/2001 Suzuki et al. ................. 347/43
6,386,673 B1 * 5/2002 Takahashi et al. ............. 347/19

* cited by examiner

Primary Examiner—Craig Hallacher
(74) Attorney, Agent, or Firm—Whitham, Curtis & Christofferson, P.C.

(57) ABSTRACT

An object of the present invention is to provide a recording head which is constructed as a line head by arranging a plurality of head components along the direction of arrangement of recording elements and in which an amount of a gap of the recording elements at each of the joints between each pair of the head components located adjacent to each other along the direction of arrangement of the recording elements is detected to achieve recording of a high-quality image free from a stripe shape nonuniformity, a blank defect, a color nonuniformity, and the like. To achieve this object, the recording head has a head portion for recording an image on a recording medium, and a sensor portion for reading the image recorded on the recording medium by the head portion. In the head portion, a plurality of head components each formed by arranging recording elements for recording an image on the recording medium are arranged along the direction of arrangement of the recording elements. In the sensor portion, a plurality of reading elements for reading the image recorded on the recording medium are arranged in one direction. The head portion and the sensor portion are placed on one base member while being fixedly positioned relatively to integrally form a head module.

19 Claims, 8 Drawing Sheets

RECORDING HEAD

BACKGROUND OF THE INVENTION

1. Field of the Invention

The present invention related to a recording head in which a head portion for recording an image and a sensor portion for reading the image recorded by the head portion are placed on one base member to form a head module.

2. Description of the Related Art

For example, a type of ink jet printer is known which records an image by using a line head capable of recording one image line on a recording medium (the line corresponding to the length of one side of the recording medium) at a time, and by moving the recording medium relative to the line head in a transport direction perpendicular to the direction of arrangement of the recording elements of the line head. Printers using a line head use a plurality of head components, and a method of increasing the printing width by placing the head components in a staggered structure is also known.

Each of the head components is constructed by arranging, in one direction, nozzles (recording elements) for forming an image on a recording medium by ejecting ink. In the staggered structure, the plurality of head components are staggered (alternately placed) between two rows along the direction of arrangement of its recording elements. Two head components placed in the different rows and located adjacent to each other along the direction of arrangement of the recording elements are placed so that a pitch between the recording elements at ends of two head components is equal to a pitch between the other recording elements which are not at the ends of two components.

In a printer using a line head of such a staggered structure, it is important to consider the accuracy of adjusting a position of the head components at their joints (gaps) from the viewpoint of recording a high-quality image free from a stripe shape density nonuniformity, a blank defect, and the like. However, the recording elements are arranged at extremely short intervals (e.g., with a pitch of about 21 $\mu$m in the case of 1200 dpi). It is considerably difficult to accurately adjust the position of the head components and to place a number of head components in a staggered structure.

SUMMARY OF THE INVENTION

In view of the above-described problem of the conventional art, an object of the present invention is to provide a recording head which is constructed as a line head by arranging a plurality of head components along the direction of arrangement of recording elements, and in which an amount of gap of the recording elements at each of the joints between each pair of the head components located adjacent to each other along the direction of arrangement of the recording elements is detected to achieve recording of a high-quality image free from a stripe shape nonuniformity, a blank defect and a color nonuniformity.

In order to attain the object described above, the present invention provides a recording head comprising: a head portion for recording an image on a recording medium, the head portion having at least one row of short head components, each row of short head components being constructed by arranging a plurality of short head components in one direction, each of the plurality of short head components having at least one row of recording elements, each row of recording elements being constructed by arranging a plurality of recording elements in the one direction; a sensor portion for reading the image recorded on the recording medium by the head portion, the sensor portion having at least one row of reading elements, each row of reading elements being constructed by arranging in the one direction a plurality of reading elements for reading the image recorded on the recording medium; and one base member on which the head portion and the sensor portion are placed while being fixedly positioned relative to each other to integrally form a head module.

Preferably, the head portion records a monochrome image on the recording medium, the at least one row of short head components in the head portion is a row of short head components, the at least one row of recording elements in each of the short head components is a row of recording elements for recording the monochrome image on the recording medium, the row of recording elements corresponding to monochrome in the monochrome image, and the at least one row of reading elements in the sensor portion is a row of reading elements for reading the monochrome image recorded on the recording medium.

Preferably, the head portion records a multicolor image on the recording medium, the at least one row of short head components in the head portion is a row of short head components being constructed by placing the plurality of short head components along the direction; and the at least one row of recording elements in one of the short head components is a plurality of rows of recording elements for recording the multicolor image on the recording medium, each of the plurality of rows of recording elements corresponding to each of a plurality of colors in the multicolor image.

Preferably, the sensor portion reads the multicolor image recorded on the recording medium by the head portion, and the at least one row of reading elements in the sensor portion is a row of reading elements for reading the multicolor image recorded on the recording medium.

Preferably, each of the plurality of reading elements is a reading element for monochrome.

Preferably, the plurality of reading elements are reading elements for reading the multicolor image recorded on the recording medium, the reading elements corresponding to respective colors in the multicolor image.

Preferably, the sensor portion reads the multicolor image recorded on the recording medium by the head portion, and the at least one row of reading elements in the sensor portion is a plurality of rows of reading elements for reading the multicolor image recorded on the recording medium, each of the plurality of rows of reading elements corresponding to each of a plurality of colors in the multicolor image.

Preferably, the head portion records a multicolor image on the recording medium, the at least one row of short head components in the head portion is a plurality of rows of short head components for recording the multicolor image on the recording medium, each of the plurality of rows of short head components corresponding to each of a plurality of colors in the multicolor image, and the at least one row of recording elements in each of rows of short head components is a row of recording elements.

Preferably, the sensor portion reads the multicolor image recorded on the recording medium by the head portion, and the at least one row of reading elements in the sensor portion is a row of reading elements for reading the multicolor image recorded on the recording medium.

Preferably, each of the plurality of reading elements is a reading element for monochrome.

Preferably, the plurality of reading elements are reading elements for reading the multicolor image recorded on the recording medium, the reading elements corresponding to respective colors in the multicolor image.

Preferably, the sensor portion reads the multicolor image recorded on the recording medium by the head portion, the at least one row of reading elements in the sensor portion is a plurality of rows of reading elements for reading the multicolor image recorded on the recording medium, each of the plurality of rows of reading elements corresponding to each of a plurality of colors in the multicolor image.

Preferably, the plurality of rows of short head components comprises respective rows of short head components corresponding to respective colors of the plurality of colors, one row of short head components for one color being constructed by arranging in the one direction the plurality of short head components adjacent to each other in a direction perpendicular to the one direction.

Preferably, the plurality of rows of short head components are constructed by arranging in the one direction a plurality of groups of short head components, each of the plurality of groups of short head components having the plurality of short head components arranged in a direction perpendicular to the one direction, each of the plurality of short head components corresponding to each of the plurality of colors.

Preferably, each of the plurality of short head components in the plurality of rows of short head components is placed as that positions of joints between the short head components in each of the plurality of rows of short head components corresponding to each of the plurality of colors are shifted.

Preferably, the sensor portion is constituted of a plurality of sensor components placed along the one direction; each of the plurality of sensor components is constructed by arranging a certain number of reading elements among the plurality of reading elements along the one direction; and a position of a recording element at one end of each of the plurality of short head components is positioned inside from the reading elements at both ends of each of the sensor components which corresponds to the recording elements at one end of each of the plurality of short head components among the plurality of sensor components.

Preferably, the sensor portion has a plurality of the reading elements placed at least a region corresponding to a predetermined number of the recording elements at both sides of the one direction from a recording element at one end of each of the plurality of short head components.

Preferably, the predetermined number of the recording elements are at least five.

Preferably, the short head components in each of the plurality of rows of short head components are placed at least in two rows along the one direction, and any two of the short head components located adjacent to each other along the one direction are placed in the different rows and placed so as to overlap at least one recording element; and the sensor portion has a plurality of reading elements placed at least a region corresponding to a region of overlapping any two of the short head components located adjacent to each other along the one direction.

To attain the object described above, according to one aspect of the present invention, there is provided a recording head comprising: a head portion for recording an image on a recording medium, the head portion being constructed of a plurality of short head components, each of which has at least one row of recording elements arranged in one direction and which are arranged along the one direction of arrangement of the recording elements; a sensor portion for reading the image recorded on the recording medium by the head portion, the sensor portion being constructed by arranging in the one direction a plurality of reading elements for reading the image recorded on the recording medium; and one base member on which the head portion and the sensor portion are placed while being fixedly positioned relative to each other to integrally form a head module.

According to the other aspect of the present invention, there is provided a recording head comprising: a head portion for recording a multicolor image on a recording medium, the head portion being constructed by placing a plurality of short head components along one direction; a sensor portion for reading the multicolor image recorded on the recording medium by the head portion, the sensor portion being constructed by arranging in the one direction a plurality of reading elements for reading the multicolor image recorded on the recording medium; and one base member on which the head portion and the sensor portion being placed while being fixedly positioned relative to each other to integrally form a head module; wherein each of the short head components has a plurality of groups of recording elements for recording the multicolor image on the recording medium, each group of the plurality of groups of recording elements corresponding to each color of a plurality of colors, a plurality of recording elements in the each group being arranged along the one direction of arrangement of the short head components.

According to the other aspect of the present invention, there is provided a recording head comprising: a head portion for recording a multicolor image on a recording medium, the head portion having a plurality of groups of short head components for recording a multicolor image on the recording medium, each group of the plurality of groups of short head components corresponding to each color of a plurality of colors, a plurality of short head components in the each group being arranged in one direction, each of the plurality of short head components in the each group corresponding to the each color having a plurality of recording elements corresponding to the each color, the plurality of recording elements being arranged along the one direction of arrangement of the short head components; a sensor portion for reading the multicolor image recorded on the recording medium by the head portion, the sensor portion being constructed by arranging in the one direction a plurality of reading elements for reading the multicolor image recorded on the recording medium; and one base member on which the head portion and the sensor portion are placed while being fixedly positioned relative to each other to integrally form a head module.

According to the other aspect of the present invention, there is provided a recording head comprising: a head portion for recording a multicolor image on a recording medium, the head portion having a plurality of groups of short head components for recording a multicolor image on the recording medium, each group of the plurality of groups of short head components corresponding to each color of a plurality of colors, a plurality of short head components in the each group being arranged in one direction, each of the plurality of short head components in the each group corresponding to the each color having a plurality of recording elements corresponding to the each color, the plurality of recording elements being arranged along the one direction of arrangement of the short head components; a sensor portion for reading the multicolor image recorded on the recording medium by the head portion, the sensor portion having a plurality of groups of reading elements for reading the multicolor image recorded on the recording medium, each group of the plurality of groups of reading elements corresponding to each color of a plurality of colors, a plurality of reading elements in the each group being arranged in the one direction; and one base member on which the head portion and the sensor portion are placed while being fixedly positioned relative to each other to integrally form a head module.

Preferably, the each of the short head components is placed as that positions of joints between the short head components in the each group corresponding to the each color are shifted.

Preferably, the sensor portion is constituted of a plurality of sensor components placed along the one direction of arrangement of the reading elements; each of the sensor components is constructed by arranging a certain number of reading elements out of the plurality of reading elements along the one direction of arrangement of the reading elements; and a position of each of the recording elements at both ends of each of the short head components is spaced apart from the reading elements at both ends of each of the sensor components in a direction toward an intermediate point of the one direction of arrangement of reading elements of corresponding the sensor component.

Preferably, the sensor portion has a plurality of the reading elements placed at least a reading element region corresponding to a region of a predetermined number of the recording elements at both sides of the one direction of arrangement of the recording elements from the recording elements at both ends of each of the short head components.

Preferably, the predetermined number of the recording elements are at least five.

Preferably, the short head components are placed at least in two rows along the one direction of arrangement of the recording elements, and any two of the short head components located adjacent to each other along the one direction of arrangement of the recording elements are placed in the different rows and placed so as to overlap at least one recording element; and the sensor portion has a plurality of the reading elements placed at least a reading element region corresponding to a region of overlapping any two of the short head components located adjacent to each other along the one direction of arrangement of the recording elements.

DESCRIPTION OF THE PREFERRED EMBODIMENTS

Preferred embodiments of a recording head in accordance with the present invention will be described in detail with reference to the accompanying drawings.

Figure 1:
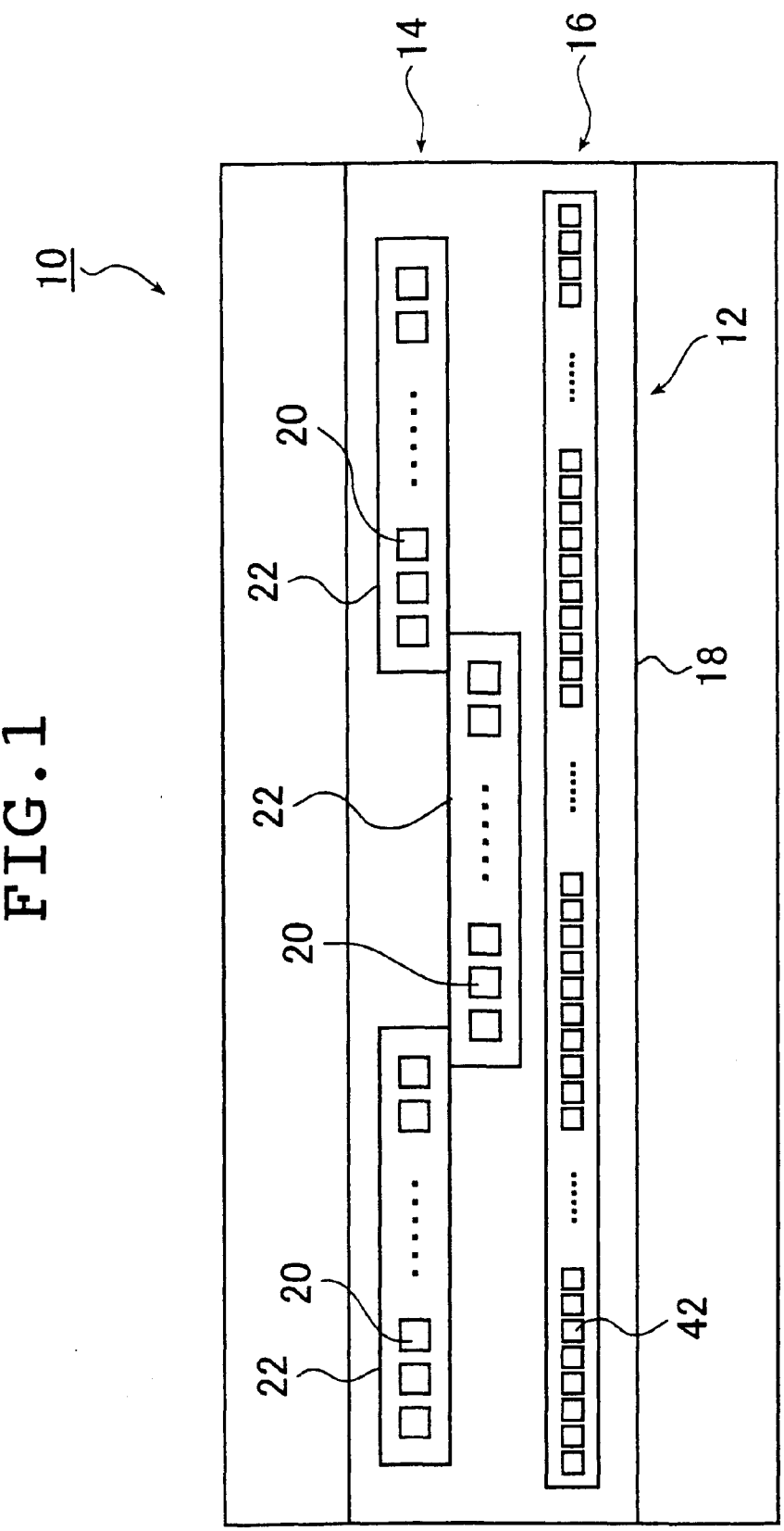
FIG. 1 is a plan view of an embodiment of a recording head in accordance with the present invention.

FIG. 1 is a plan view of an embodiment of the recording head in accordance with the present invention.

FIG. 1 illustrates one example of a recording head 10 of an monochromic ink jet printer, which represents the recording head in accordance with the present invention. The illustrated recording head 10 has a head portion 14 and a sensor portion 16, which portions are placed parallel with each other on one base member 18 to form an integral head module 12. That is, the head portion 14 and the sensor portion 16 are maintained in a fixed positional relationship.

In the recording head 10, the head portion 14 is, for example, a line head capable of recording one image line on a recording medium (the line corresponding to the length of one side of the recording medium) at a time. The line head has a plurality of short head chips (semiconductor chips) 22, i.e., three short head chips 22 in the illustrated example, each formed by arranging in one direction a plurality of nozzles (recording elements) 20 for ejecting ink. The number of short head chips 22 are not limited but not smaller than two, and may be selected according to the size, the number of pixels, resolution of images to be recorded, and the like.

These short head chips 22 are placed in a staggered structure. That is, the plurality of short head chips 22 are placed in two rows extending along the direction of arrangement of their recording elements 20, and two of the short head chips 22 located adjacent to each other along the direction of arrangement of the recording elements 20 are respectively placed in the different rows. In the illustrated example, three short head chips 22 are staggered (alternately placed) between two rows. A necessary and sufficient number of rows of short head chips 22 is two. However, three or more rows of short head chips 22 may be provided with no problem. The placement of short head chips 22 is not limited to the staggered structure, and short head chips 22 may be placed in any other manner as long as they are placed along the direction of arrangement of recording elements 20.

In the illustrated example, two of the short head chips 22 located adjacent to each other along the direction of arrangement of recording elements 20 and respectively placed in the different rows are placed so that the pitch between the recording elements 20 at the ends of the two short head chips 22 is equal to the pitch between the other recording elements 20 which are not at the ends of two components. Two of the short head chips 22 located adjacent to each other along the direction of arrangement of recording elements 20 may be placed as overlapping one or more of recording elements 20. In such a case, one of the corresponding two recording elements 20 in the overlapping portions may be used as a recording element.

The short head chips 22 provided as a head component will be described below.

Figure 2:
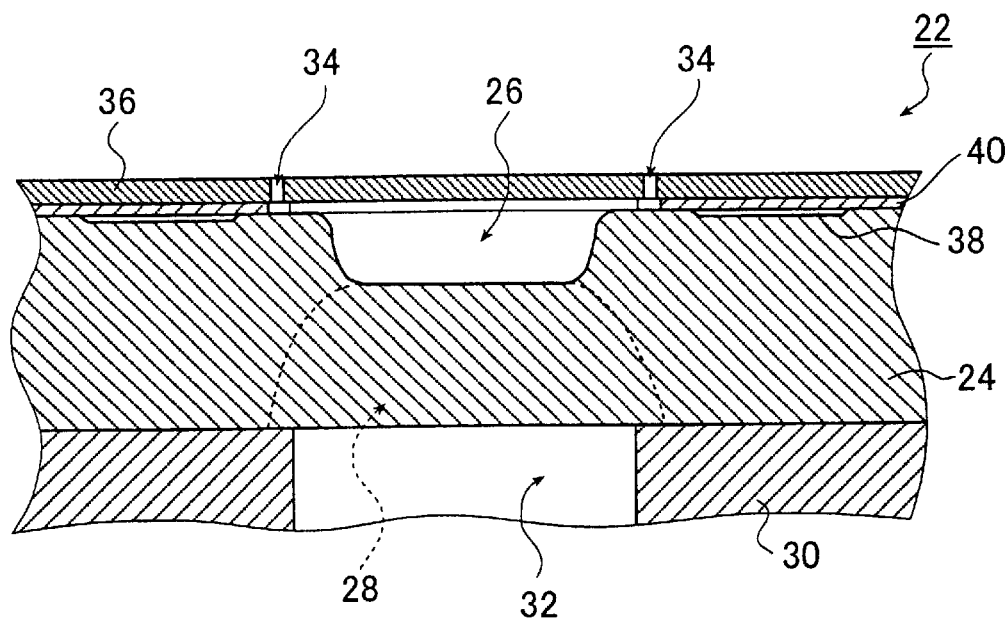
FIG. 2 is a cross-sectional view of an embodiment of a short head chip in accordance with the present invention.

FIG. 2 is a cross-sectional view of each short head chip 22.

The short head chip 22 shown in FIG. 2 is fabricated by using a semiconductor manufacturing technique, as described below. First, an ink groove 26 for supplying ink to a nozzle is formed in a center of a semiconductor substrate (silicon substrate) 24 as viewed in the figure by digging a surface portion of the semiconductor substrate 24 so as to extend to a direction perpendicular to a paper surface of the figure.

In this ink groove 26, a plurality of ink supply holes 28 are arranged at certain intervals along the direction in which the ink groove 26 extends. The ink supply holes 28 are opened through the semiconductor substrate 24 so as to connect the ink groove 26 with the back surface of the semiconductor substrate 24 in order to supply the ink to the ink groove 26. A supporting frame 30 is a support member on which the semiconductor substrate 24 is placed. In this supporting frame 30, an ink groove 32 through which ink supplied from an ink tank (not shown) is supplied via the ink supply holes 28 to the ink groove 26 formed in a front surface of the semiconductor substrate 24 is formed.

In laterally symmetrical positions (in the drawing) sandwiching the ink groove 26, two nozzle columns in which a plurality of nozzles 34 are alternately arranged at regular intervals along the ink groove 26 are provided. The respective nozzles (orifices) 34 have a hollow circular shape and are formed in an orifice plate 36 which is laminated on the semiconductor substrate 24 and made of polyimide or the like. For example, in the case of 360 npi (nozzle per inch), with respect to the nozzle columns, the nozzles 34 are arranged at a pitch of about 71 $\mu$m per column. Thus, a resolution of 720 npi can be realized by using these two columns.

Heat resistors (not shown) for controlling a discharge of ink from the respective nozzles 34 are formed over the semiconductor substrate 24 and under the nozzle columns. In addition, driver circuits 38 for driving the respective heating resistors are formed on the surface of the semiconductor substrate 24 of the outside of the nozzle columns from the ink groove 26. A barrier wall 40 for forming an ink flow path supplying the ink from the ink groove 26 to the respective nozzles 34 is formed between the surface of the semiconductor substrate 24 and the orifice plate 36.

The ink from the ink tank is passed through the ink groove 32 of the support frame 30 and supplied to the ink groove 26 in the surface of the semiconductor substrate 24 through the ink supply holes 28 opened in the semiconductor substrate 24. The supplied ink is divided to the nozzle columns formed in both sides of the ink groove 26 through the ink flow path formed by the barrier wall 40. Then, the turning on and off of the respective heating resistors are controlled by the driver circuits 38 in accordance with image data and thus a predetermined amount of ink is discharged from the corresponding respective nozzles 34.

If the line head is of a type such as to be capable of recording one full image line with respect to a recording medium at a time, by using this recording head, an image can be recorded on the entire surface of the recording medium at high-speed by moving the recording medium in a transport direction. Even in a case where the line head is incapable of recording one full image line with respect to a recording medium at a time, an image of rows corresponding to recording elements of the recording head is recorded by moving the recording medium in the transport direction, and successively changing the position of the recording head are repeated, thus enabling high-speed recording of an image even on a large-size recording medium.

On the other hand, the sensor portion 16 is capable of reading an image recorded on a recording medium with the head portion 14. The sensor portion 16 is formed as a line sensor by arranging in one direction light receiving elements (reading elements) 42 which receive reflected light from the image recorded on the recording medium illuminated with illumination light, and perform photoelectric conversion of the received light to obtain image data corresponding to the recorded image. The light receiving elements 42 are arranged through a range exceeding the recording elements 20 at the both ends of the line head to enable reading a range beyond the recording elements 20 at the both ends of the line head.

As the line sensor, any of well-known devices, e.g., a charge-coupled device (CCD) or a contact inline sensor (CIS) can be used. In order to detect accurately an amount of print gap relating to the recording elements 20 at the both ends of the short head chips 22, i.e., the recording elements 20 at the both ends of the line head and the recording elements 20 at the joint of each adjacent pair of short head chips 22, it is preferable that the number of reading elements 42 per unit length in one row in the longitudinal arrangement direction of the sensor portion 16 is set to 1.4 times or larger than the number of recording hi elements 20 per unit length in one row in the longitudinal arrangement direction of the head portion.

Figure 3:
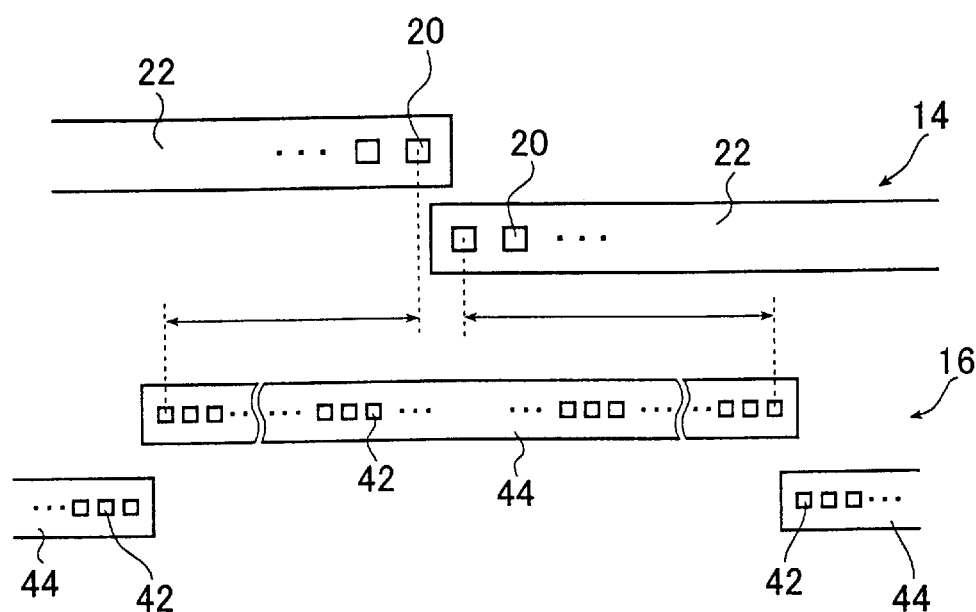
FIG. 3 is a plan view of an embodiment of a portion of the recording head of the present invention.

Naturally, there is also a limit to the length of the line sensor. Therefore an arrangement such as shown in FIG. 3 may be used, in which the sensor 16 is divided into two or more sensor components 44, and these sensor components are arranged, for example, in a staggered structure along the direction of arrangement of reading elements 42. In such a case, two of the sensor components 44 located adjacent to each other along the direction of arrangement of reading elements 42 may be placed as overlapping one or more of reading elements in the same way as the corresponding components in the head portion 14. In such a case, one of the corresponding two reading elements 42 in the overlapping portions may be used as a reading element.

In the case where the sensor portion 16 is divided into a plurality of sensor components 44, it is necessary that position of each of the recording elements 20 at the both ends of each short head chip 22 is spaced predetermined number of elements away from the reading elements 42 at the both ends of each of the sensor component 44 in a direction toward an inner point of the direction of arrangement of reading elements 42 of corresponding sensor component 44, as indicated by arrows in FIG. 3. For example, the number of elements is five recording elements 20, although a different number of recording elements 20 may be set depending upon correction processing. In other words, an area of five recording elements 20 at the both sides of the direction of arrangement of recording elements 20 from position of each of the recording elements 20 at the both ends of each short head chip 22 should be read by one Pointless sensor component 44.

In this embodiment, an image printed by the line head is read with reading elements 42 in the line sensor in a region corresponding to a region of five recording elements 20 at the both sides of the direction of arrangement of recording elements 20 from a position of each of the recording elements 20 at the both ends of each short head chip 22. Image data of an image read by the reading elements 42 of the line sensor corresponding to about ten recording elements 20 defined as described above is used to detect an amount of print gap relating to the recording elements 20 at the both ends of the short head chips 22, and image data corresponding to the recording elements in the vicinity of the joint between the short head chips 22 is corrected according to the detected amount of gap.

That is, the position of each of the joints between the short head chips 22 and the position of each of the joints between the sensor components are distanced apart (shifted) from each other to enable ascertainment of problems as described below. If data read from the non-joint portion of the short head chips 22 with the line sensor has a problem, the problem is regarded as due to some of the joints between the sensor components. Conversely, if data read with the line sensor from a head portion including one of the joints between the short head chips 22 has a problem, the problem is regarded as due to the joints between the short head chips.

If the sensor portion 16 is of a type such as to be capable of reading one full image line recorded with the head portion 14, as in the illustrated example, it can be used by itself as a scanner head. In the case where the sensor portion 16 is used only for compensation for a print gap without being used as a scanner head, an arrangement may suffice in which a plurality of reading elements 42 are disposed only in the reading element 42 region corresponding to the recording element 20 region defined by a predetermined number of recording elements 20, e.g., five recording elements 20 at the both sides of the direction of arrangement of recording elements 20 from the recording elements at the both ends of the short head chip 22. Preferably, in the sensor portion 16, a plurality of reading elements 42 are placed throughout the region corresponding to the recording element 20 region defined as an overlapping portion of each pair of short head chips 22 located adjacent to each other along the direction of arrangement of the recording elements 20.

Figure 4:
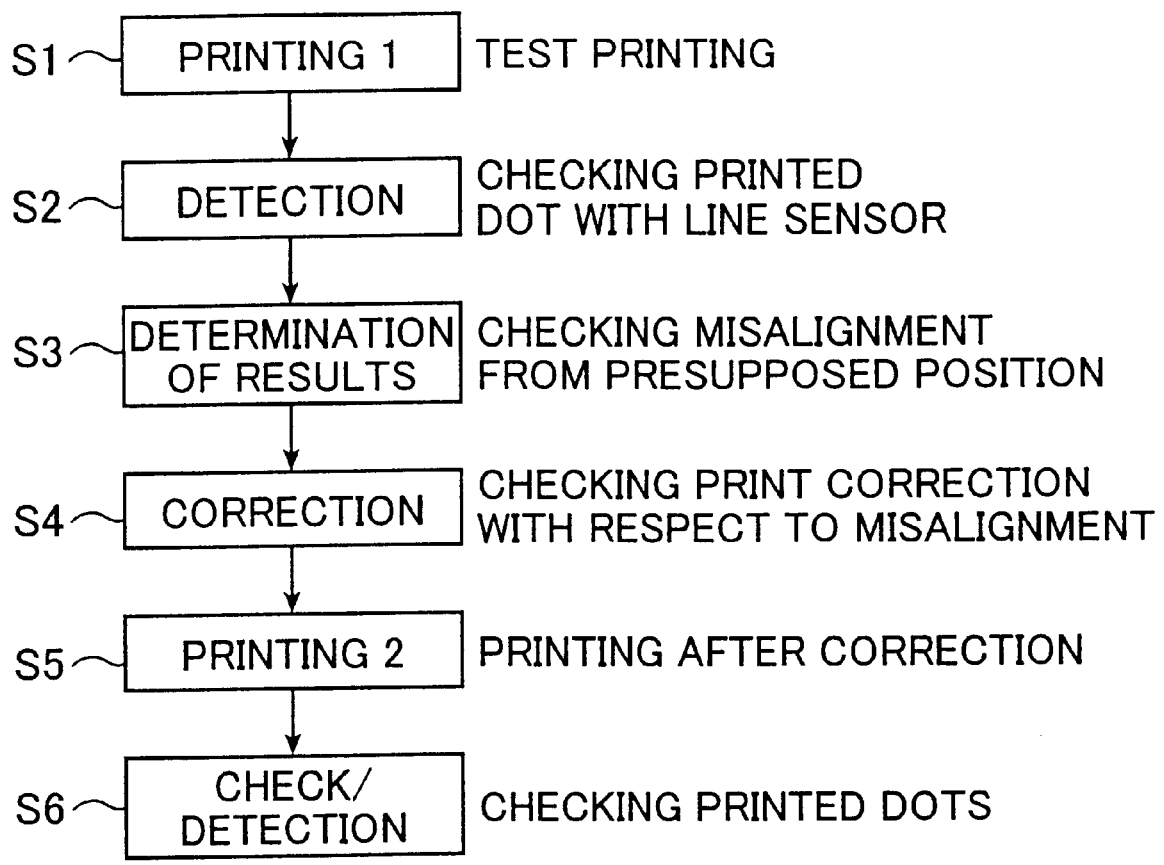
FIG. 4 is a flowchart showing steps in a correction process in the embodiment of the present invention.

An example of processing when compensation is made for an amount of print gap relating to the recording elements 20 at the both ends of short head chips 22 will be described with reference to the flowchart of FIG. 4.

First test printing is performed with the head portion 14 (S1). In test printing in this embodiment, one horizontal straight line, for example, is printed while the recording medium transport speed is fixed. To facilitate detection of an amount of print gap, only every nth nozzle (n: an integer larger than 1) in the direction of arrangement of recording elements 20 may be used for printing.

The image printed by test printing with the head portion 14 is read with the sensor portion 16 (S2), and an amount of gap of the position of an actually recorded image is detected from the presupposed position, i.e., the position at which the image is to be recorded (S3). A print gap occurs from an image printed with recording elements 20 at the joints between the short head chips 22.

Print correction processing is performed on the basis of the detection amount of gap (S4). This print correction processing can be performed on the basis of any of well-known conventional correction methods. To compensate for a print gap in the direction of arrangement of recording elements 20, image data supplied to some of peripheral elements of the recording elements 20 at the both ends of the short head chips 22 corresponding to a print gap is changed according to the amount of gap, as described above With respect to a print gap in the recording medium transport direction, printing timing is changed to correct it.

In the case of a line sensor formed of a plurality of short head chips 22, the direction of gap may be different depending upon each short head chip 22. In such a case, the direction of gap can be detected by reading image recorded with the recording elements 20 at the both ends of the short head chips 22.

Finally, second test printing is performed in the same manner by using the corrected image data (S5), and the printing image is read to check whether the print gap is confirmed in the test print after correction processing (S6).

Since the recording head 10 of the present invention is constructed as a head module 12 in which the head portion 14 and the sensor portion 16 are placed on one base member 18, the positional relationship between the head portion 14 and the sensor portion 16 is basically fixed. Therefore, a positioning gap between the head portion 14 and the sensor portion 16 at the time of assembly is fixed Consequently, a print gap in an image recorded with the head portion 14 is detected more correctly in comparison with a case in which the head portion 14 and the sensor portion 16 are separately placed.

In the recording head 10 of the present invention, a print gap relating to the recording elements 20 at the both ends of each short head chip 22 can be detected and compensated so that high-quality image can be recorded free from a stripe shape nonuniformity, a blank defect, a color nonuniformity, and the like. According to the present invention, compensation can be made for a print gap even after assembly of the recording head 10. Therefore, the recording head 10 does not need to be assembled with high accuracy alignment and can be manufactured at an improved yield and, hence, at a low cost.

In the recording head 10 of the present invention, the compensation for a print gap is made naturally at shipping of the product. Also, if one of the short head chips 22 is defective, it is replaced with a normal one, and a print gap with respect to the recording elements 20 at the both ends of the replaced short head chip 22 is detected and compensation can be made for it. Thus, even if a defective is occurred, it is not necessary to replace the entire head module 12, and the repair cost can be limited.

The present invention can also be applied to a recording head of an ink jet printer for recording a multicolor image on a recording medium. In the case of an application to such a head, the head portion 14 may be constructed using short head chips 22 each of which is formed by integrating rows of nozzles for a plurality of colors used for recording a multicolor image on a recording medium, as shown in FIGS. 5 to 8, or alternatively, using short head chips 22 in which rows of nozzles for each of the colors used for recording a multicolor image are formed individually, as shown in FIG. 9.

Figure 5:
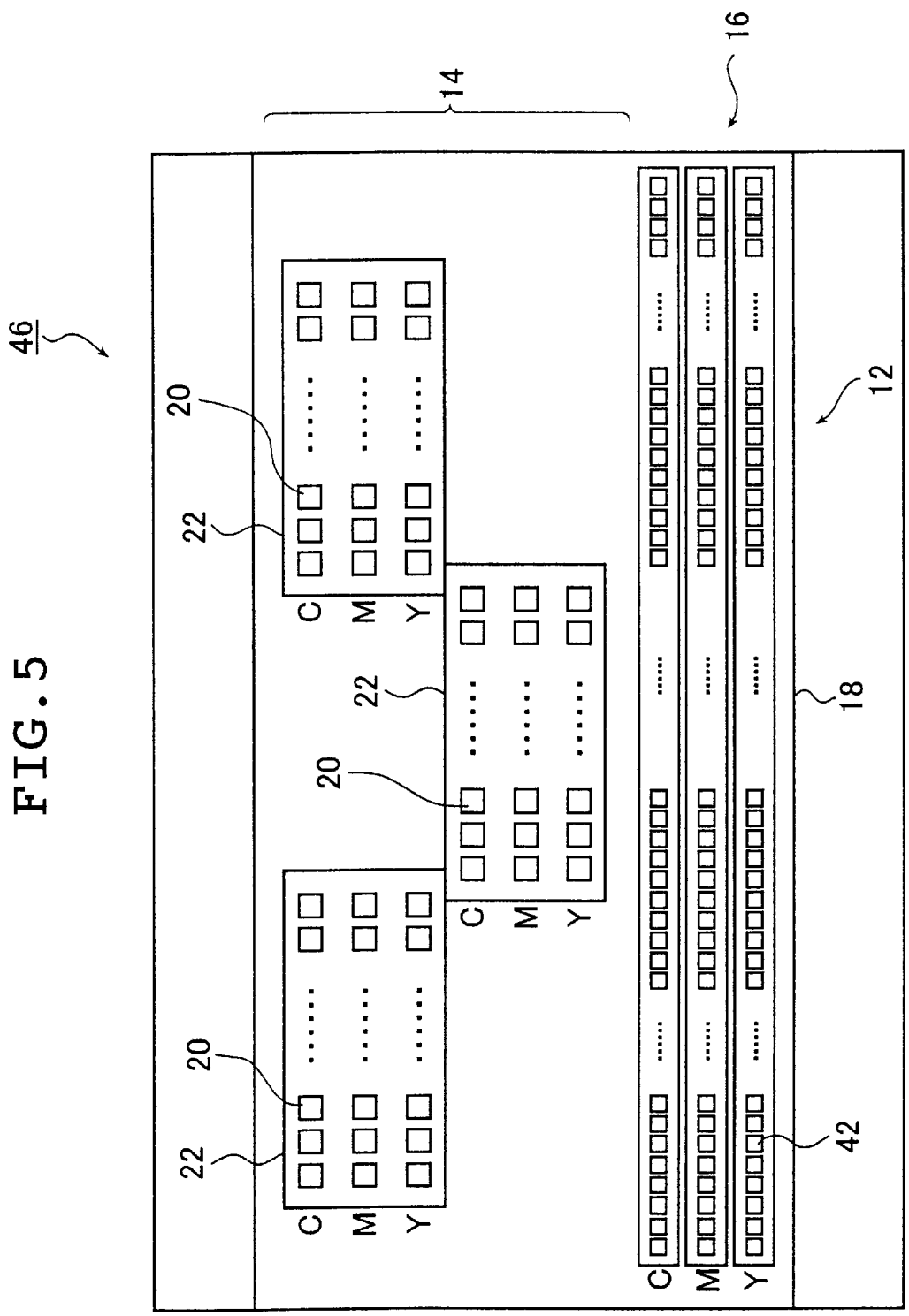
FIG. 5 is a plan view of another embodiment of the recording head of the present invention.

In the case of using short head chips 22 formed by integrating rows of nozzles for each of the colors used for recording a multicolor image, the head portion 14 has a plurality of short head chips 22 arranged along one direction (that is to say, along one line), as in the recording head 46 shown in FIG. 5, for example. Each short head chip 22 has a plurality of groups of recording elements 20 for each of the colors used for recording a multicolor image and a plurality of recording elements 20 of each group corresponding to each color are arranged along the direction of arrangement of the short head chips 22 and arranged in different rows each other.

In the recording head 46 shown in FIG. 5, for example, each short head chip 22 has three groups of recording elements 20 for colors C (cyan), M (magenta) and Y (yellow), respectively, and a plurality of recording elements 20 of each group corresponding to each of the colors C, M and Y are arranged along the direction of arrangement of the short head chips 22 and arranged in different rows each other.

If number of colors are used for recording of multicolor images, for example, in a case that six colors, such as three colors LC (light cyan), LM (light magenta) and LY (light yellow) added to three colors C , M and Y, are used in total for multicolor recording, short head chips 22 may each be formed by integrating rows of nozzles for six colors in whole. Or alternatively, as in the recording head 48 shown in FIG. 6, short head chips 22 may be divided into two or more groups, such as a group of short head chips 22 formed by integrating rows of nozzles for colors C, M and Y and a group of short head chips 22 formed by integrating rows of nozzles for colors LC, LM and LY.

Further, in the recording head 46 shown in FIG. 57 every short head chip 22 has rows of recording elements 20 arranged in a unique order represented, that is to say, one for color C, one for color M and then one for color Y from above in the figure, although the order of arrangement of recording element rows is not limited to this. In fact, rows of recording elements 20 for each of the colors used for recording a multicolor image may be arranged in any order. In the recording head 50 shown in FIG. 7, for example, rows of recording elements 20 are arranged in the order of one for C, one for M and one for Y in the short head chip 22 positioned at the left end in the figure, in the order of one for M, one for Y and one for C in the second short head chip 22 from the left end, in the order of one for Y, one for C and one for M in the third short head chip 22 from the left end, and so on.

Figure 6:
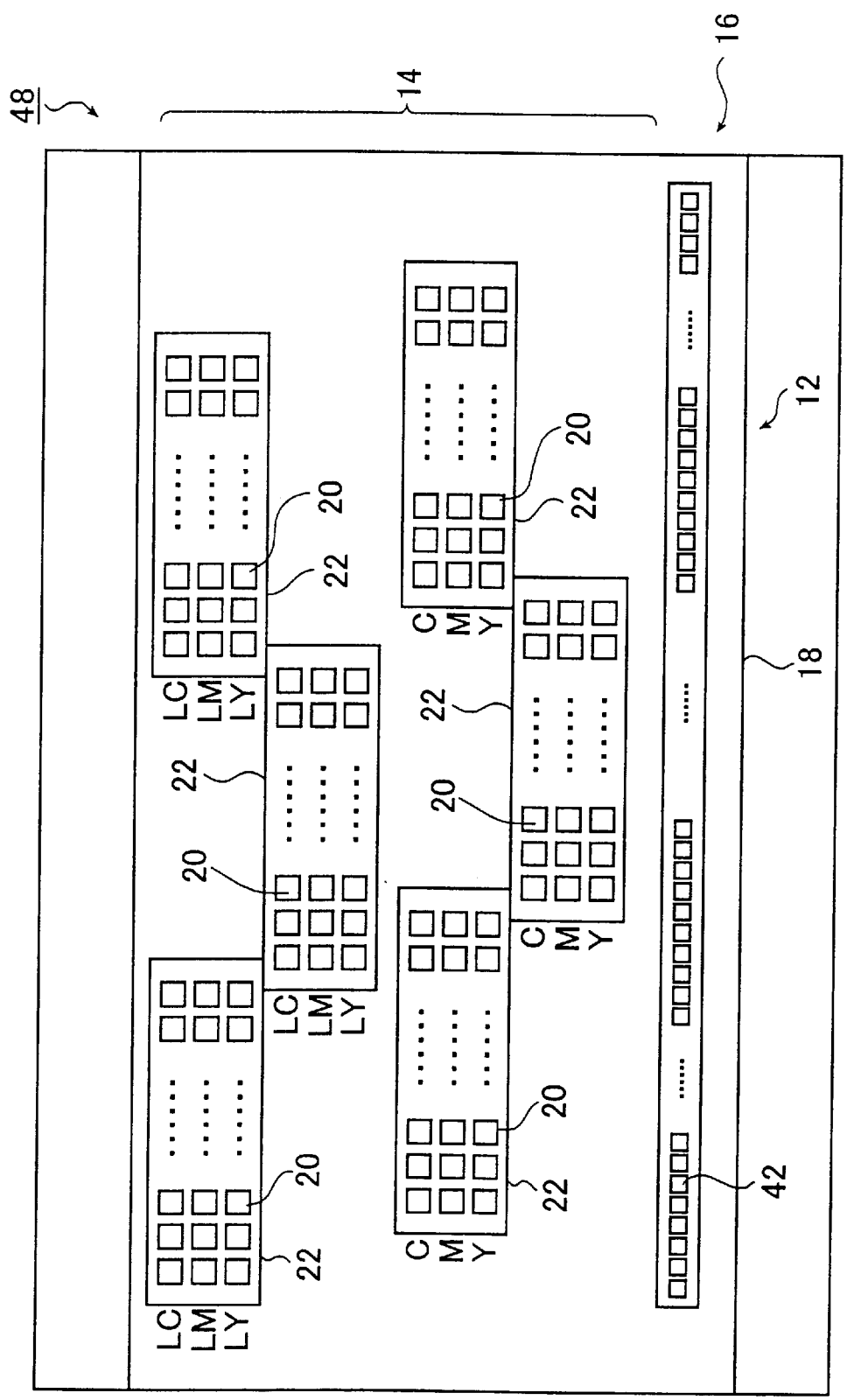
FIG. 6 is a plan view of another embodiment of the recording head of the present invention.
Figure 7:
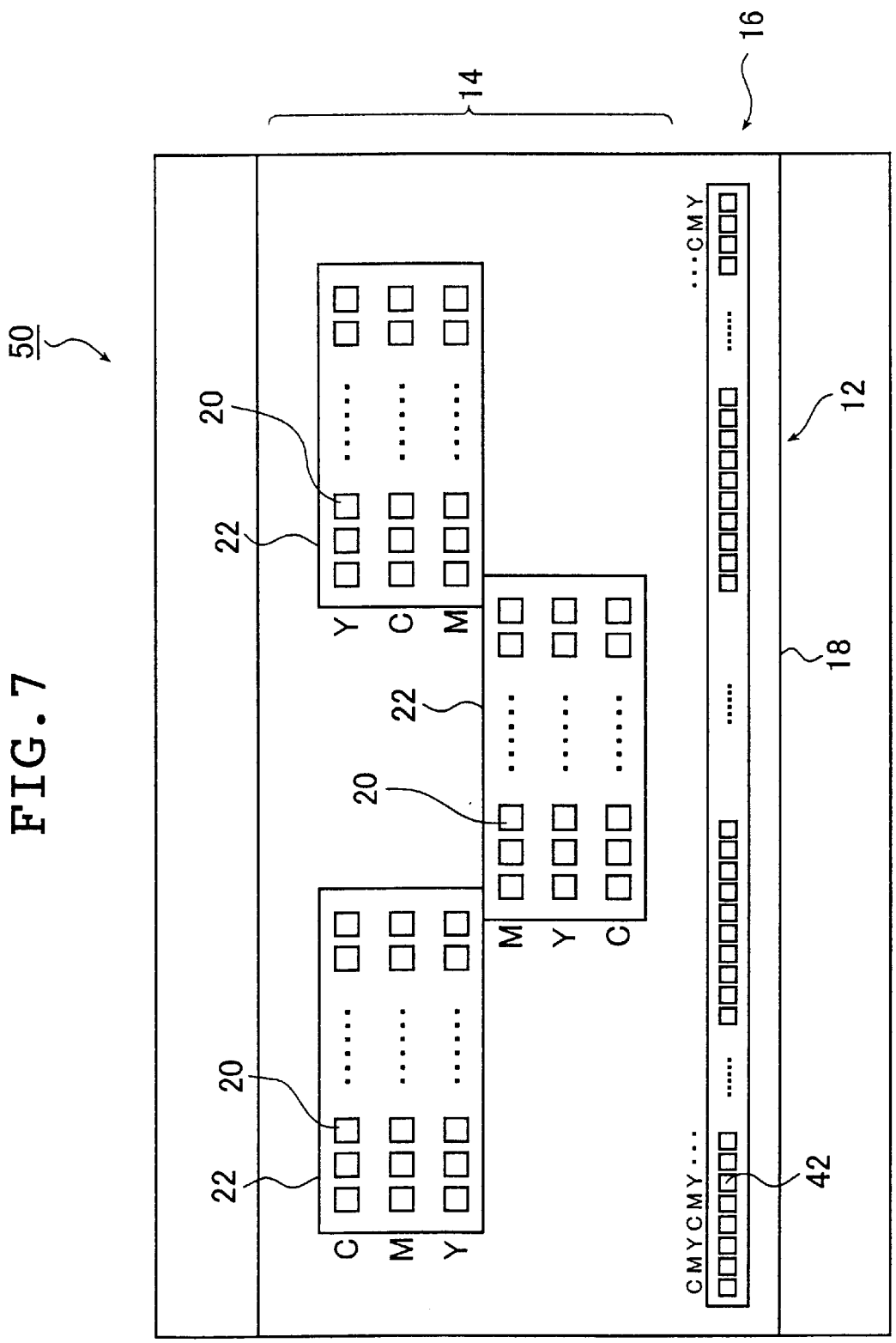
FIG. 7 is a plan view of another embodiment of the recording head of the present invention.

In the recording heads 46, 48 and 50 shown in FIGS. 5 to 7, recording elements 20 for each of the colors used for recording a multicolor image are arranged in different rows each other. The arrangement of recording elements 20 is, however, not limited to such, In such applications as to making of color copies, where a high resolution is not required, the head portion 14 may be constructed by arranging a plurality of short head chips 22 along one line, in each of which recording elements 20 for each of the colors used for recording a multicolor image are arranged along the direction of arrangement of the short head chips 22 in a unique row and in a repeated order specified with regard to colors used for recording a multicolor image, as in the recording head 54 shown in FIG. 8.

Thus in the case of using short head chips 22 formed by integrating rows of nozzles for each of the colors used for recording a multicolor image, rows of recording elements 20 for each of the colors used for recording a multicolor image in each short head chip 22 are fixedly positioned relative to each other. In this case, accordingly, a print gap can be advantageously regarded as not present among the colors used for recording a multicolor image In the case of using short head chips 22 in which rows of nozzles for each of the colors used for recording a multicolor image are formed individually, on the other hand, the head portion 14 has a plurality of groups of short head chips 22 for each of the colors used for recording a multicolor image and a plurality of short head chips 22 of each group corresponding to each color are arranged in one direction and arranged in different rows each other, as in the recording head 54 shown in FIG. 9. In the short head chips 22 for each of the colors used for recording a multicolor image, a plurality of recording elements 20 corresponding to each color are arranged along the direction of arrangement of the short head chips 22.

In a case where short head chips 22 are separately provided with respect to each of the colors used for recording a multicolor image, it is preferable to leave (shift) the positions of the joints between the short head chips 22 for each of the colors used for recording a multicolor image each other, as shown in FIG. 9, in order to accurately detect an amount of print gap of each color, although this is not essential for the present invention.

In the case where the present invention is applied to a recording head of a color ink jet printer, amounts of print gap in areas of the joints between the short head chips 22 can be detected by printing images of each of the colors used for recording a multicolor image with shifted recording timings and at a position physically distanced from each other, and then sequentially reading images of each of the colors used for recording a multicolor image by a sensor portion 16 for monochrome reading, independent of a difference whether short head chips 22 formed by integrating rows of nozzles for each of the colors used for recording a multicolor image are employed or short head chips 22, in which rows of nozzles for different colors are formed individually, are employed.

Figure 8:
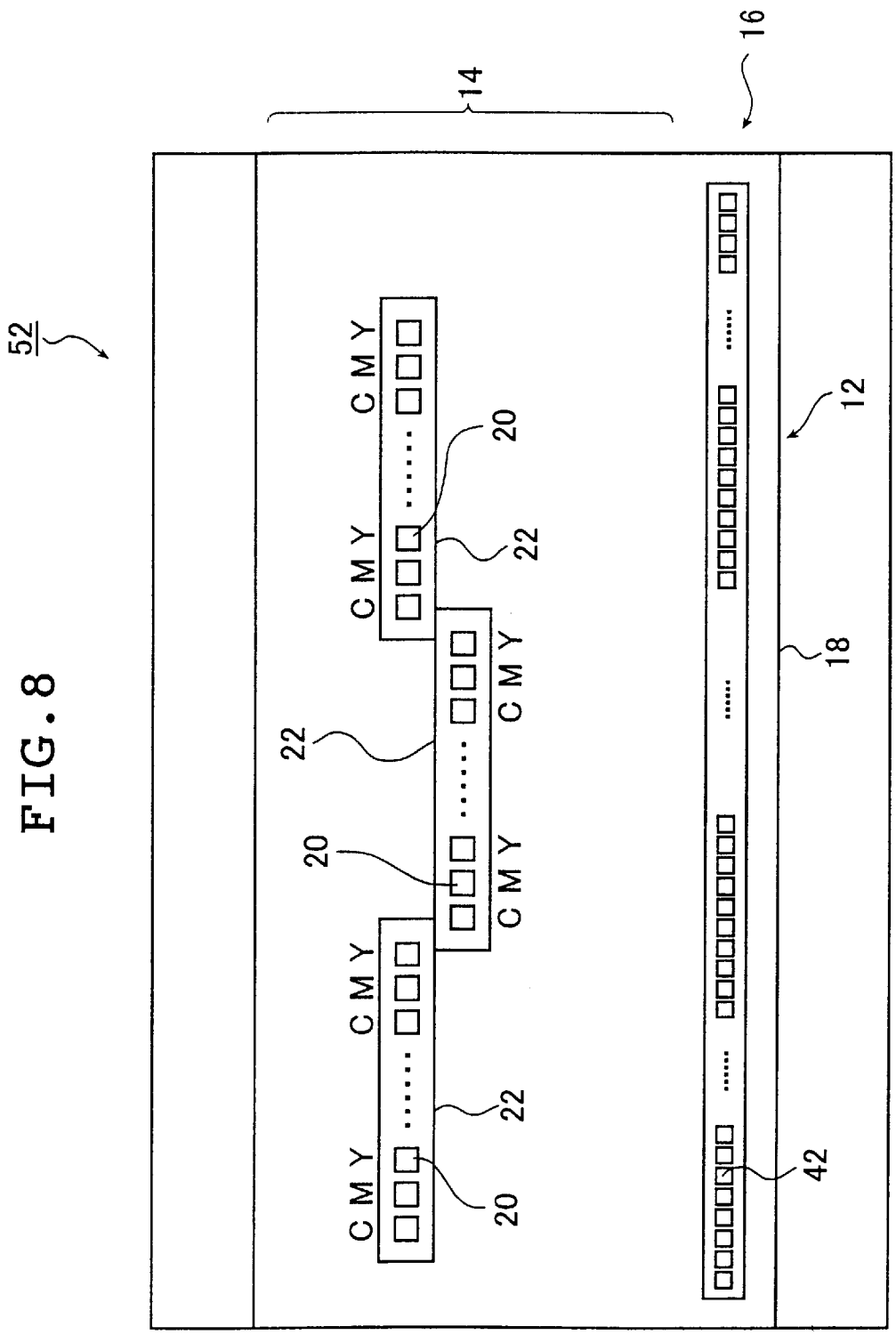
FIG. 8 is a plan view of another embodiment of the recording head of the present invention.
Figure 9:
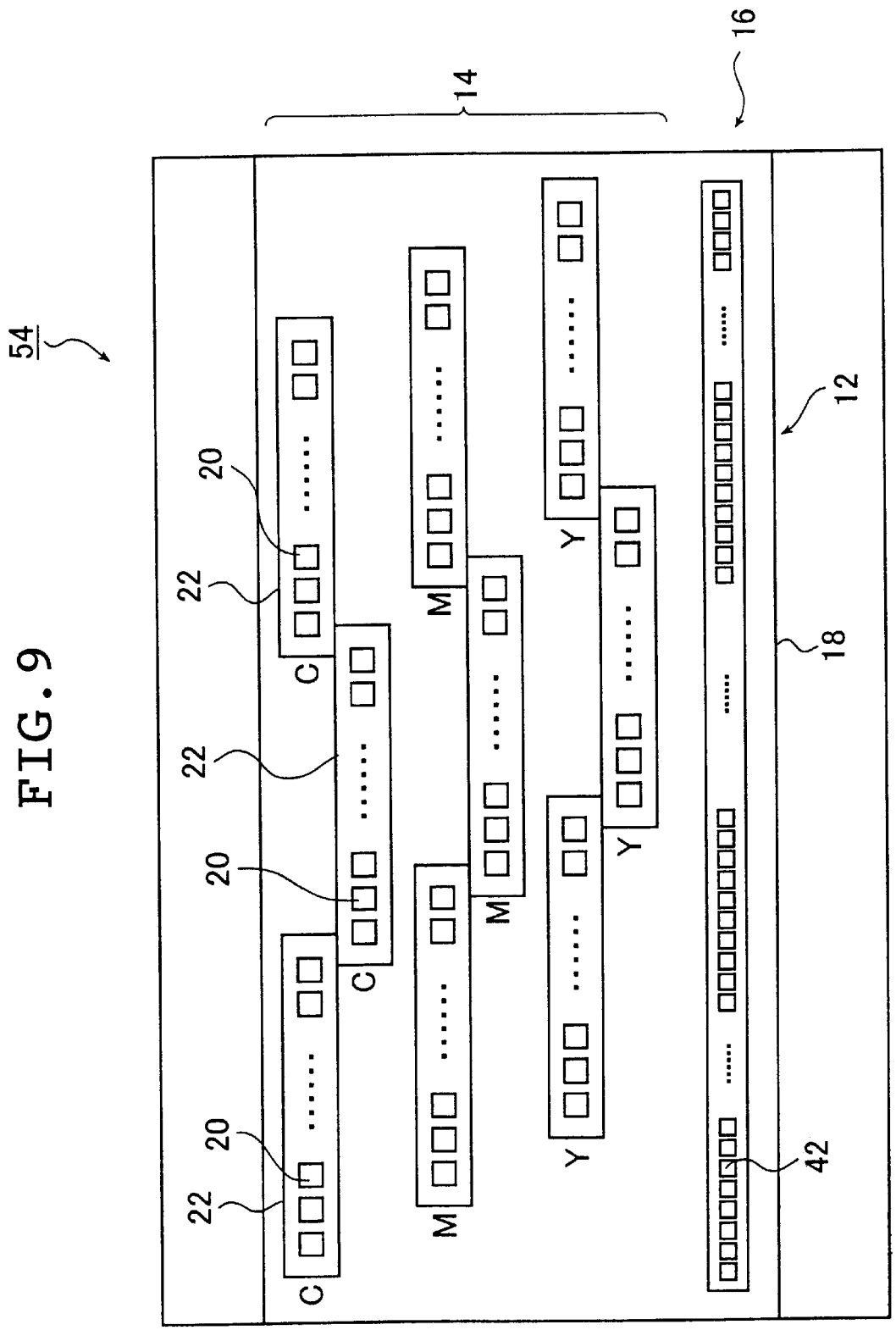
FIG. 9 is a plan view of another embodiment of the recording head of the present invention.

In the recording heads 48 and 52 shown in FIGS. 6 and 8, for example, short head chips 22 formed by integrating rows of nozzles for each of the colors used for recording a multicolor image are employed. If the head portion 14 is divided into two groups of short head chips 22 for colors C, M and Y as well as for colors LC, LM and LY, as in the recording head 48 shown in FIG. 6, a total of two sensor portions 16 for monochrome reading may be provided according to each of the two groups of the short head chips 22 respectively.

In the recording head 54 shown in FIG. 9, short head chips 22 in which rows of nozzles for each of the colors used for recording a multicolor image are formed individually are employed. In cases with such recording heads, amounts of print gap at the positions of the joints between the short head chips 22 for each of the colors used for recording a multicolor image can be sequentially detected by a sensor portion 16 for monochrome reading, independent of a difference whether or not the joint positions of the short read chips 22 for each of the colors used for recording a multicolor image are shifted from each other.

Thus, one sensor portion 16 for monochrome reading will be enough for operation, even if the recording head of the present invention is applied to a color ink jet printer.

It may also be possible to use a sensor portion 16 for multicolor reading, which is obtained by adjusting the wave length of light absorbed by reading elements 42, for example, to detect amounts of print gap in areas of the joints between the short head chips 22, as in the recording head 46 shown in FIG. 5. In this case, the sensor portion 16 has a plurality of groups of reading elements 42 for reading a multicolor image recorded on a recording medium with respect to each of the colors used for recording a multicolor image and a plurality of reading elements 42 for each of the colors used for recording a multicolor image are arranged along one direction and in different rows each other.

In the recording head 46 shown in FIG. 5, for example, the sensor portion 16 has three groups of reading elements 42 for the colors C (cyan), M (magenta) and Y (yellow), respectively, and a plurality of reading elements 42 for the colors C, M and Y are arranged along one direction and in a different rows each other.

In such a sensor portion as above, if groups of reading elements 42 for each of the colors used for recording a multicolor image are arranged independently in each other, there will arise a problem relating to the accuracy of relative positioning among the line sensors for each of the colors used for recording a multicolor image. Therefore, it is preferable to integrate all of groups of reading elements 42 for each of the colors used for recording a multicolor image.

The sensor portion 16 for multicolor reading may also be constructed by arranging all the reading elements 42 for each of the colors used for recording a multicolor image in a unique row and in a repeated order specified with regard to colors while reducing the interval between reading elements 42 (namely, the arrangement pitch of reading elements 42), as in the recording head 50 shown in FIG. 7, for example. In this case, it is inevitably required that the arrangement pitch of reading elements 42 is smaller than the arrangement pitch of recording elements 20.

In the recording head 50 shown in FIG. 7, the sensor portion 16 is constructed by arranging all the reading elements 42 for the colors C, M and Y in a unique row and in a repeated order represented as one for C, one for M and then one for Y, while reducing the arrangement pitch of reading elements 42 to one third of the arrangement pitch of reading elements 42 in the recording head 52 shown in FIG. 8.

Also in a case where the present invention is applied to a recording head of a color ink jet printer, it is possible that the sensor portion 16 may be divided into two or more sensor components 44 and the divided components may be placed along the direction of arrangement of reading elements 42, as shown in FIG. 3.

In the embodiments as described above, a plurality of colors used for recording a multicolor image on a recording medium (recording elements 20) are exemplified by two groups of colors, namely colors C, X and Y as well as LC, LM and LY, and a plurality of colors with respect to which a multicolor image recorded on a recording medium is read (reading elements 42) are exemplified by colors C, M and Y. However, colors for recording or reading of multicolor images are not limited to these. Such colors as R (red), G (green) and B (blue) may be additionally employed and any other combination of colors may also be available. Moreover, the number of colors used is by no means limited.

To construct the head portion 14, any of various well-known ink jet head structures can be used. Therefore, the head portion 14 may be of a top shooter type (face ink jet type) or a side shooter type (edge ink jet type). Also, the head portion 14 may be a thermal ink jet head which ejects ink by heating or a head which vibrates a diaphragm by using a piezoelectric element, electrostatic force, or the like to eject ink.

The embodiments illustrated in the drawings have been described about an example of the short head chips 22 formed of semiconductor chips. The head component, however, is not limited to semiconductor chips.

Further, the present invention is not limited to recording heads for ink jet printers. The present invention can be applied to any recording head 10 using a head portion 14 placed along the direction of arrangement of recording elements, and which can read with a sensor portion 16 at the same speed as the speed of printing after the printing with the head portion 14.

The recording head of the present invention is arranged basically as described above.

While the embodiments of the recording head of the present invention has been described in detail, the present invention is not limited to the described embodiments and various modifications and changes of the embodiments can, of course, be made without departing from the scope of the invention.

As described above in detail, the recording head of the present invention has a head portion constructed by placing a plurality of head components along the direction of arrangement of recording elements, and a sensor portion, the head portion and the sensor portion being placed on one base member while being fixedly positioned relative to each other to integrally form a head module.

The recording head of the present invention thus constructed can accurately detect a print gap relating to the recording elements at the both ends of each head component, and can record a high-quality image free from a stripe shape nonuniformity, and a blank defect. According to the present invention, compensation can be made for a print gap even after assembly of the recording head, and the recording head does not need to be assembled with high accuracy alignment and can be manufactured at an improved yield and, hence, at a low cost.

What is claimed is:

1. A recording head comprising:

a head portion for recording an image on a recording medium, said head portion having at least one row of short head components, each row of short head components being constructed by arranging a plurality of short head components in one direction, each of said plurality of short head components having at least one row of recording elements, each row of recording elements being constructed by arranging a plurality of recording elements in said one direction;

a sensor portion for reading the image recorded on the recording medium by said head portion, said sensor portion having at least one row of reading elements, each row of reading elements being constructed by arranging in said one direction a plurality of reading elements for reading the image recorded on the recording medium; and one base member on which said head portion and said sensor portion are placed while being fixedly positioned relative to each other to integrally form a head module.

2. The recording head according to claim 1, wherein said head portion records a monochrome image on said recording medium, said at least one row of short head components in the head portion is a row of short head components, said at least one row of recording elements in each of said short head components is a row of recording elements for recording said monochrome image on said recording medium, said row of recording elements corresponding to monochrome in said monochrome image, and said at least one row of reading elements in the sensor portion is a row of reading elements for reading said monochrome image recorded on said recording medium.

3. The recording head according to claim 1, wherein:

said head portion records a multicolor image on said recording medium, said at least one row of short head components in said head portion is a row of short head components being constructed by placing said plurality of short head components along said direction; and said at least one row of recording elements in one of said short head components is a plurality of rows of recording elements for recording said multicolor image on said recording medium, each of said plurality of rows of recording elements corresponding to each of a plurality of colors in said multicolor image.

4. The recording head according to claim 3, wherein said sensor portion reads said multicolor image recorded on said recording medium by said head portion, and said at least one row of reading elements in said sensor portion is a row of reading elements for reading the multicolor image recorded on the recording medium.

5. The recording head according to claim 4, wherein each of said plurality of reading elements is a reading element for monochrome.

6. The recording head according to claim 4, wherein said plurality of reading elements are reading elements for reading said multicolor image recorded on said recording medium, said reading elements corresponding to respective colors in said multicolor image.

7. The recording head according to claim 3, wherein said sensor portion reads said multicolor image recorded on said recording medium by said head portion, and said at least one row of reading elements in said sensor portion is a plurality of rows of reading elements for reading said multicolor image recorded on said recording medium, each of said plurality of rows of reading elements corresponding to each of a plurality of colors in said multicolor image.

8. The recording head according to claim 1, wherein said head portion records a multicolor image on said recording medium, said at least one row of short head components in said head portion is a plurality of rows of short head components for recording said multicolor image on the recording medium, each of said plurality of rows of short head components corresponding to each of a plurality of colors in said multicolor image, and said at least one row of recording elements in each of rows of short head components is a row of recording elements.

9. The recording head according to claim 8, wherein said sensor portion reads said multicolor image recorded on said recording medium by said head portion, and said at least one row of reading elements in said sensor portion is a row of reading elements for reading the multicolor image recorded on the recording medium.

10. The recording head according to claim 9, wherein each of said plurality of reading elements is a reading element for monochrome.

11. The recording head according to claim 9, wherein said plurality of reading elements are reading elements for reading said multicolor image recorded on said recording medium, said reading elements corresponding to respective colors in said multicolor image.

12. The recording head according to claim 8, wherein:

said sensor portion reads said multicolor image recorded on said recording medium by said head portion, said at least one row of reading elements in said sensor portion is a plurality of rows of reading elements for reading said multicolor image recorded on said recording medium, each of said plurality of rows of reading elements corresponding to each of a plurality of colors in said multicolor image.

13. The recording head according to claim 8, wherein said plurality of rows of short head components comprises respective rows of short head components corresponding to respective colors of said plurality of colors, one row of short head components for one color being constructed by arranging in said one direction said plurality of short head components adjacent to each other in a direction perpendicular to said one direction.

14. The recording head according to claim 8, wherein said plurality of rows of short head components are constructed by arranging in said one direction a plurality of groups of short head components, each of said plurality of groups of short head components having the plurality of short head components arranged in a direction perpendicular to said one direction, each of said plurality of short head components corresponding to each of said plurality of colors.

15. The recording head according to claim 8, wherein each of said plurality of short head components in said plurality of rows of short head components is placed as that positions of joints between said short head components in each of said plurality of rows of short head components corresponding to each of said plurality of colors are shifted.

16. The recording head according to claim 1, wherein said sensor portion is constituted of a plurality of sensor components placed along said one direction:

each of said plurality of sensor components is constructed by arranging a certain number of reading elements among said plurality of reading elements along said one direction; and a position of a recording element at one end of each of said plurality of short head components is positioned inside from the reading elements at both ends of each of said sensor components which corresponds to said recording elements at one end of each of said plurality of short head components among said plurality of sensor components.

17. The recording head according to claim 1, wherein said sensor portion has a plurality of the reading elements placed at least a region corresponding to a predetermined number of the recording elements at both sides of said one direction from a recording element at one end of each of said plurality of short head components.

18. The recording head according to claim 17, wherein said predetermined number of the recording elements are at least five.

19. The recording head according to claim 1, wherein said short head components in each of said plurality of rows of short head components are placed at least in two rows along said one direction, and any two of said short head components located adjacent to each other along said one direction are placed in the different rows and placed so as to overlap at least one recording element; and said sensor portion has a plurality of reading elements placed at least a region corresponding to a region of overlapping any two of said short head components located adjacent to each other along said one direction.

* * * * *